128,752

UNITED STATES PATENT OFFICE.

NATHANIEL A. PRATT, OF CHARLESTON, SOUTH CAROLINA, AND GEORGE T. LEWIS, OF PHILADELPHIA, PENNSYLVANIA.

IMPROVEMENT IN TREATING PHOSPHATIC ROCK, &c.

Specification forming part of Letters Patent No. 128,752, dated July 9, 1872.

*To all whom it may concern:*

Be it known that we, NATHANIEL ALPHEUS PRATT, of Charleston, South Carolina, and GEORGE T. LEWIS, of Philadelphia, Pennsylvania, have invented a new and useful Improved Method in Treating Phosphatic Rock or other phosphatic substances or other material, to make super-phosphate of lime or manure and other commercial phosphates; and we do hereby declare the following to be a full, clear, and exact description thereof.

Our process is adapted especially to the treatment of the native phosphates of South Carolina, United States of America, or any other phosphatic material, but may be also used in other kindred applications. It consists in grinding the phosphatic material—say ten (10) tons—in an ordinary burr-stone mill or chaser, or other well-known form of mill; and while this is going on a gradual stream of dilute acid is fed into the mill of sufficient strength and quantity to dissolve or decompose the phosphate or other material, and having sufficient water with it to form with the resulting mass a paste. For this purpose there will be required a mixture of sulphuric acid—five to five and a half tons, more or less—of strength 66° Baumé, and of water, either fresh or salt, ten to fifteen tons, more or less, according to the composition of the material being treated. A floating siphon may be employed to regulate the amount of acid and water supplied to the mill according to the amount of material ground in a given time. Instead of sulphuric acid any other acid or acid-salt may be employed. The mixed paste produced is to be placed in ordinary bagging-sacks, or such other parcel as may be found most efficient, and submitted to hydraulic or other pressure until the phosphoric extract is squeezed out. Pressure in a centrifugal machine will answer well. The phosphatic extract thus pressed out may be evaporated by artificial heat or dried with artificial driers, such as lime, plaster of Paris, sawdust, cotton-seed, or oil-cake. Dried phosphates or super-phosphates may be used, and the compound packed for manure; or, after it is thus dried, and instead of mixing it with the substances last named, carbonate of soda, (soda ash,) carbonate of potash, (potash of commerce,) sulphate of ammonia, sulphate of soda, chloride of sodium, (common salt,) carbonate of magnesia, or other salts or alkaline earths may be mixed in a dry state; or, instead of evaporating the phosphatic extract, as in the first instance, a mixture therewith of the alkaline salts above mentioned, or the alkaline earthic bases may be made, and after mixture the compound may be calcined or dried.

What we claim, and desire to secure by Letters Patent of the United States, is—

1. Treating the phosphatic extract obtained after the pressure or squeezing, as herein described, by evaporating down to dryness or to a crystallizable state to make a manure or other commercial product.

2. Treating the phosphatic extract obtained after the pressure or squeezing, as herein described, by mixing the same with the salts of soda, potash, magnesia, or ammonia, or with the bases of said salts, and then evaporating the mixture to make a manure or other commercial product.

3. Treating, in a reverberatory or calcining furnace, the phosphatic extract obtained after the pressure or squeezing, after evaporation, as herein described, mixed with the salts of soda, potash, ammonia, or magnesia, to produce compound phosphates of lime and of the alkalies.

4. Mixing the phosphatic extract obtained after pressure or squeezing with plaster of Paris, lime, starch, sawdust, cotton-seed, oil-cake, dried phosphate, or super-phosphate, for the purpose of making a manure or other commercial product.

N. A. PRATT.
GEORGE T. LEWIS.

Witnesses to signature of N. A. PRATT:
R. S. BRUNS,
R. M. HADDON.

Witnesses to signature of GEORGE T. LEWIS:
EDWARD J. FASY,
SAM. N. LEWIS.